Sept. 8, 1964 S. D. GOLDMAN 3,147,552
CONTINUOUS DENTAL MATRIX UNIT
Filed Dec. 26, 1961
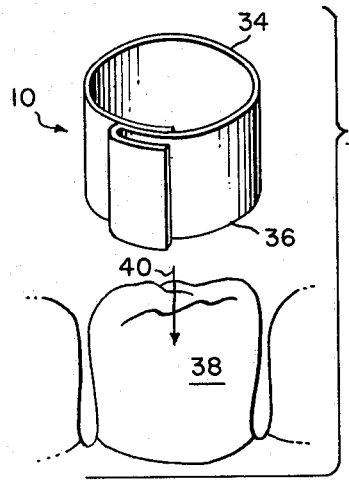
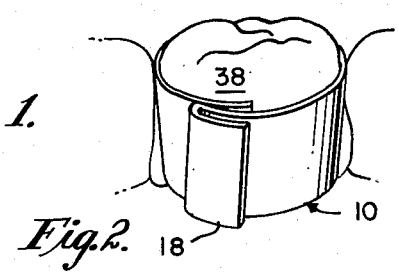
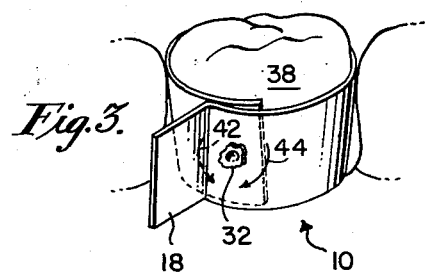
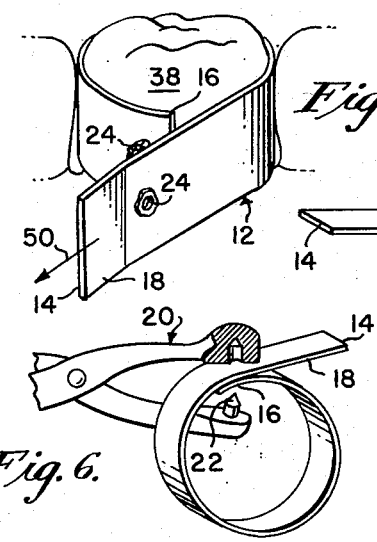
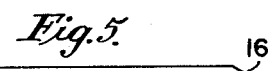
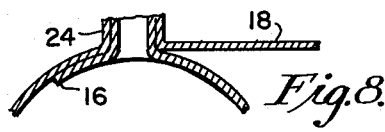
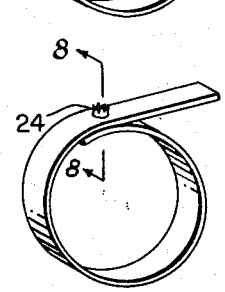
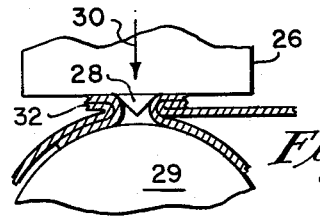
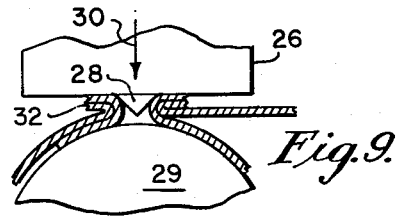
INVENTOR.
SANFORD D. GOLDMAN
BY
Caesar and Rivise
ATTORNEYS.

United States Patent Office 3,147,552
Patented Sept. 8, 1964

3,147,552
CONTINUOUS DENTAL MATRIX UNIT
Sanford D. Goldman, 1425 Riverview Drive,
Lima, Ohio
Filed Dec. 26, 1961, Ser. No. 162,109
2 Claims. (Cl. 32—63)

This invention relates to a dental matrix band and more particularly to a dental matrix band which is unitary and self clamping.

It has long been common in the dental art to fill cavities in teeth by first properly preparing each cavity, thereafter snugly surrounding the tooth and cavity with a flexible metallic strip known as a matrix band, then inserting the filling material and finally removing the matrix band and finishing the filling.

The most common prior method of using a matrix band was to provide a metal foil band, wrap it around three sides of a tooth, leaving the outermost side open with the two ends exposed and then encasing the tooth within the band by securely clamping the two exposed outer ends. There are numerous intricate, bulky clamping devices which are on the market for this purpose.

In the past, smaller clamping devices made of foil have also been developed. However, these devices required careful manipulation to properly cover the tooth. They were also difficult to remove after use.

Other matrix bands have been developed wherein the clamping means is permanently secured to the matrix band. However, these matrix bands are more difficult to make since a separate operation is required to secure the clamping means to the matrix band. Also, after the matrix band is placed over the tooth, additional adjustment and manipulation are required.

It is therefore an object of this invention to provide an improved dental matrix band which is unitary in structure and self clamping.

It is another object of this invention to provide a dental matrix band which may be easily applied and removed from a tooth.

It is a further object of this invention to provide a dental matrix band which will conform closely to the side walls of a tooth.

It is yet a further object of this invention to provide a dental matrix band which is inexpensive and simple in construction.

While another object of this invention is to provide a dental matrix band which does not require the use of special tools or instruments for its application or removal.

Yet another object of this invention is to provide a dental matrix band which is readily applied to any tooth regardless of its position within the mouth.

A yet further object of this invention is to provide a dental matrix band which may be applied to a tooth with a minimum of discomfort to the patient.

The foregoing objects are obtained by providing a dental matrix unit comprising a thin flexible band having a first end portion and a second end portion, said band being formed into a cylindrical shape with said end portions being pivotally secured together in such a manner that said second end portion provides a removal tab adjacent the pivotal securement.

Other objects and many of the attendant advantages of this invention will be readily appreciated as the same becomes better understood by reference to the following detailed description when considered in connection with the accompanying drawings wherein:

FIG. 1 is an exploded perspective view of the dental matrix unit of this invention and a tooth, and showing the unit immediately prior to application to the tooth;

FIG. 2 is a perspective view of the dental matrix unit of this invention immediately after application to the tooth;

FIG. 3 is a perspective view similar to FIG. 2 but illustrating the self clamping action of the unit and showing the removal tab in operative position;

FIG. 4 is a perspective view illustrating the method of removing the dental matrix unit after it has been used;

FIG. 5 is a perspective view of the band of this invention in flat condition;

FIG. 6 is a perspective view of the punching operation for forming the band into a cylindrical shape;

FIG. 7 is a perspective view of the band in a cylindrical shape after the punching operation has been completed;

FIG. 8 is an enlarged sectional view along the lines 8—8 of FIG. 7; and

FIG. 9 is a sectional view showing the crimping operation which locks the matrix unit in its final position.

Referring now in greater detail to the various figures of the drawings wherein similar reference characters refer to similar parts, a continuous dental matrix unit embodying the present invention is generally shown at 10 in FIG. 1.

Device 10 is formed from a thin, resilient, flexible strip of metal 12 shown in FIG. 5. The strip 12 is preferably made of thin gage stainless steel or other metal which is highly flexible. A preferred thickness range is between 0.001 and 0.005 inch, although a wider range is possible. The preferred width of the strip can vary between ⅛ and ⅜ inch, although a wider range is possible.

Strip 12 (FIG. 4) has first and second end portions 14 and 16. In order to form the matrix band of this invention, strip 12 is formed into a cylindrical shape with end portion 16 being placed against end portion 14 in such a manner that end portion 14 provides an overlapping tab 18. The two end portions are then pivotally secured. As seen in FIG. 3, this pivotal securement is approximately midway between the upper and lower edges of strip 12.

The method of obtaining this pivotal securement is by staking one end portion to the other. This staking operation is well known in the art of joining two parts. One method of carrying it out is shown in FIGS. 6 to 9.

The cylindrical strip having the overlapping end portions is first punched by means of a conventional hole punch 20. One difference is, however, that the punching member 22 is pointed, whereby the overlapping end portions will be torn rather than completely punched out of strip 12. Thus, after the punch is made, upstanding jagged sections 24 will result. As seen in FIG. 8, the jagged sections form a small cylindrical wall which is sufficient to secure the strip 12 in its cylindrical configuration.

In order to complete the staking operation, the jagged sections 24 are crimped. This crimping step is shown in FIG. 9 and is accomplished by means of a device that contains a flat surface 26 having a central positioning point 28. A cylindrical bearing surface 29 is placed within the cylinder formed from strip 12, and the flat surface 26 is pressed downwardly in the direction of arrow 30. The pressure in the direction of arrow 30 will cause the jagged sections to spread and flatten out as shown at 32. The staking process is illustrated as being carried out in two steps, for the purpose of clarity. It is to be understood, however, that there are devices that can be used to make the staking in a one step process.

The method of using dental matrix band 10 is illustrated in FIGS. 1 to 4. If necessary, the upper and lower surfaces 34 and 36 may be trimmed and contoured to conform to the crown and gum line of the particular tooth to be treated. After the trimming, device 10 is placed over a tooth 39 by telescoping it in the direction of arrow 40. Prior to application of device 10, the tooth is prepared for filling in the manner well known to the art.

FIG. 2 shows the tooth 38 with matrix band 10 in operative position for filling. It is important to note that a tooth usually is generally of a conical configuration having a broad head which tapers as the gum is approached. As previously pointed out, the staking process provides a pivotal securement of one end portion to the other. Thus when the matrix band 10 is applied to a tooth as shown in FIG. 2, the upper portion is pivoted outwardly around the stake securement 32 by virtue of the broad head of the tooth, and is thereby narrowed at the bottom edge of the tooth. This clamping automatically occurs due to the normal contour of the tooth as aforesaid. As shown in FIG. 3 the band 10 pivots in the directions of arrows 42 and 44. The stake fastener 32 is approximately midway between the upper and lower edges of matrix band 10 to accomplish closer conformity to the outer contour of the tooth when the band is pivoted into a frusto-conical shape.

After the tooth has been filled, the matrix unit 10 is removed. One of the distinct advantages of the matrix unit of this invention is its ease of removal. The method of removal is illustrated in FIG. 4. It merely involves pulling tab 18 in the direction of arrow 50, thereby separating end portion 14 from end portion 16. The strip 12 is then easily lifted from the tooth in the usual manner.

It should be noted that the amount of force necessary to separate the end portions is very small. This is due to the thin, flexible nature of the metal strip. A slight pull in an outward direction will cause the crimped jagged edges 24 on end portion 16 to become free of each other, as shown in FIG. 4. However, the staking is sufficiently strong to combat any tensile stresses that occur when the dental matrix unit is placed over a tooth.

The dental matrix unit of this invention can accommodate a wide variety of tooth sizes and shapes due to the fact that it can be made up into units of graduated circumferences. Varying amounts of tooth taper are easily accommodated by the pivotable or rotational nature of the stake fastener 32.

Obviously many modifications and variations of the present invention are possible in the light of the above teachings. It is, therefore, to be understood that within the scope of the appended claims, the invention may be practiced otherwise than as specifically described.

What is claimed as the invention is:

1. A dental matrix unit comprising a strip of thin, flexible metal having a first end portion and a second end portion, said strip being formed into a cylindrical shape by circumferentially overlapping said end portions, with said end portions being pivotally secured together in such a manner that said second end portion provides a removal tab adjacent the pivotal securement, said pivotal securement being unitary with said strip and comprising a stake fastener, said dental matrix unit being of a size to snugly surround a tooth, whereby a tight fit around the tooth can be obtained by telescoping said matrix unit over said tooth, with said pivotal securement providing a self-clamping action.

2. The dental matrix unit of claim 1 wherein said strip has a top edge and bottom edge, and said pivotal securement is approximately midway between the two edges.

References Cited in the file of this patent

UNITED STATES PATENTS

| | | |
|---|---|---|
| 218,260 | Haiman | Aug. 5, 1879 |
| 346,082 | Brophy | July 20, 1886 |
| 369,701 | Fletcher | Sept. 13, 1887 |
| 597,582 | Knapp | Jan. 18, 1898 |
| 713,273 | Alexander | Nov. 11, 1902 |
| 2,004,182 | Arey | June 11, 1935 |
| 2,035,135 | Lebow | Mar. 24, 1936 |
| 2,423,627 | Tinnerman | July 8, 1947 |
| 2,467,969 | Debrot | Apr. 19, 1949 |